Patented July 2, 1940

2,206,434

UNITED STATES PATENT OFFICE 2,206,434

THERMOPLASTIC COMPOSITION

Hymen Shrager and Barney Shinberg, Lawrence, Mass., assignors to Atlas Shoe Products Corporation, Lowell, Mass., a corporation of Massachusetts No Drawing. Application October 27, 1938, Serial No. 237,366

3 Claims. (Cl. 260—755)

This invention relates to improvements in thermoplastic compositions, particularly such compositions as are suitable to be used in the manufacture of stock from which are made shoe box toes for shoes, and the present application constitutes in part a continuation of our application, Ser. No. 190,325, filed February 12, 1938.

In the manufacture of thermoplastic box toes, a sheet of suitable fibrous material, such as steamed felt or water-aid felt, is saturated with a thermoplastic composition in a hot bath, cooled, and then cut into blanks which are incorporated in the shoe structure, and the present invention is concerned primarily with the preparation of the thermoplastic composition.

The present invention has for its primary object to provide an improved thermoplastic composition and a novel method or process of making the same, which, when used as a saturant for fibrous material from which shoe box toes are cut, will give a box toe blank having stiffness which will maintain the finished box toe in the desired shaped form, with a sufficient flexibility to prevent distortion without cracking or breaking, and acquiring a tackiness when subjected to the steam of the lasting operation which causes a fusion of the toe cap to the lining and upper of the shoe without bleeding through and discoloring the lining or the shoe upper.

In the preparation of the composition embodying the present invention, the first step consists in mixing together in a rubber mill, rubber, in the form of solidified rubber latex, and gum copal. Although in the mixing of these two substances the copal is in excess of the rubber, as will be seen from the hereinafter given examples, no difficulty is encountered of the material sticking on the rolls and the mixture can be milled and sheeted with very little trouble. The rubber receives no particular treatment other than the mixing or milling to which it is subjected with the copal, the operation of the mill being carried on for the required time to break down the rubber to a workable condition.

We prefer to use the grades of copal known as Manila CBB and Manila DBB, which grades consist of mixtures of Boea and Loba copals. These consist of small chips and nubs containing bark and other foreign material. Although the foregoing grades of copal are preferred and, as will be readily understood, these grades are a mixture of semi-fossil and fossil resins, use may be made of other gums that are known in the trade as "fossil" gums, the term referring in a generic sense to the gums obtained either directly from trees or from fossil remains. The copal is given a preparatory treatment by grinding it and screening it through a 40 mesh screen. The copal-rubber mixture is then readily and uniformly blended.

Good results are obtained in the production of the present thermoplastic composition when the rubber and copal are milled together in the proportions of one part rubber to two parts copal, but it has also been found that satisfactory results are obtained with a mixture of four parts of rubber and five parts of copal, these proportions being by weight. The milled mixture of rubber and copal, after being formed into sheets, assumes a firm condition and is of a frangible nature in that the sheet can be readily broken up.

The rubber-copal mixture is then dissolved in a preponderant amount of hot rosin or mixture of rosin and montan wax, or other suitable hard wax. Rubber added to the rosin or rosin-wax mixture in this manner dissolves readily. The temperature required is not excessive and will not cause thermal decomposition of the rosin or the depolymerization of the rubber.

In the foregoing paragraph, it is stated that the rubber and fossil gum mixture is dissolved in hot rosin or a mixture of rosin and montan wax or other suitable hard wax and while the use of rosin is preferred, it is possible to use cheap resins other than wood rosin. For example, use could be made of a cumar resin or a mixture of wood rosin and a suitable synthetic resin.

After preparing the composition in this manner, the fibrous material is then saturated therewith by dipping the material in a hot solution of the composition, and after the stock sheet thus prepared has cooled, it may be cut into the desired box toe blanks.

The blanks prepared with the composition herein set forth are characterized by having a stiffness which causes them to maintain their proper shape when incorporated in a shoe structure but they are sufficiently resilient or flexible to permit slight deformation without becoming cracked or broken, and they are characterized further by becoming slightly tacky when subjected to the steam of the lasting operation so that the toe cap becomes fused to the lining and upper of the shoe without bleeding through or discoloring the lining or the shoe upper.

We are aware that other thermoplastics have been made for use in the manufacture of box toes which use rubber, but these compositions have disadvantages which are not present in the composition herein set forth.

In one such composition of which we are aware, vulcanized rubber is added directly to a rosin mixture, which procedure must lead to depolymerization of the rubber. By "rosin mixture" we refer to rosin and asphalt, or rosin along with the waxes or plasticizers commonly used in the manufacture of box toes. An alternative method of preparing this composition is by dissolving vulcanized rubber in a volatile solvent or by using a vulcanized latex and adding these to the rosin mixture, resulting in compositions of inferior quality to the composition embodying the present invention. In the procedure set forth in this application, the rubber-copal mixture swells immediately on being added to the rosin and dissolves readily without depolymerization.

In another process known to us, rubber is milled with a hydrophilic colloid. When this is added to the rosin bath, a two-phase mixture is formed, the particles of rubber being protected by a hydrophilic colloid, the rosin mixture forming the continuous phase of the dispersion. The mixture embodying the present invention is prepared without the use of a hydrophilic colloid and is single phased.

The rubber used in the present mixture with the copal is in the form of solidified rubber latex which is not given any particular treatment before being mixed with the copal other than the usual milling by which the rubber is broken down to a workable condition. If reclaimed rubber is used, it is given a shorter breakdown period on the mill before being mixed with the copal gum as the reclaimed rubber is much softer.

Previously it has been stated that other resins may be used with the rubber copal mixture, reference having been made to synthetic resins. An example of such synthetic resin is the product obtainable under the name Vinsol, which is a hard, brittle thermoplastic material of resinous nature produced from the Southern long leaf pine. Although a satisfactory mixture is obtainable by mixing the rubber copal mixture with the cheaper natural resins or with the synthetic resins, the best results are obtained with the use of rosin alone or a mixture of rosin and montan wax. Carnauba wax may also be employed in place of the montan wax.

As an example of a composition using rosin and wax, a mixture of six parts wood rosin and one part montan wax may be made, and in this may be dissolved the previously referred rubber-copal mixture made up in the proportions respectively of 4 to 5. In this mixture the rubber-copal combination will be employed in a quantity sufficient to make the rubber content approximate 7% of the entire mass.

What is claimed is:

1. The process of preparing an improved thermoplastic composition which comprises grinding together in a suitable mill a mixture of rubber and a resin in the dry form until a homogeneous mass has been formed, and then adding such mass to and dissolving it in a preponderant amount of fused rosin.

2. The process of preparing an improved thermoplastic composition which comprises mixing together in a suitable mill rubber and copal in the dry form until a homogeneous mass has been formed, and then adding such mass to and dissolving it in a mixture of rosin and hard wax.

3. The process of preparing an improved thermoplastic composition which comprises grinding together in a suitable mill a mixture of rubber and a fossil gum in the dry form to form a homogeneous mass and then adding such mass to and dissolving it in a fused rosin mixture.

HYMEN SHRAGER.
BARNEY SHINBERG.